(12) United States Patent
Griffin et al.

(10) Patent No.: US 8,641,142 B2
(45) Date of Patent: Feb. 4, 2014

(54) WEIGHT BASED VEHICLE SEAT OCCUPANT DETECTION DEVICE

(75) Inventors: Dennis P. Griffin, Noblesville, IN (US); Andrew H. Curtis, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 352 days.

(21) Appl. No.: 12/938,724

(22) Filed: Nov. 3, 2010

(65) Prior Publication Data
US 2012/0104812 A1    May 3, 2012

(51) Int. Cl.
*A47C 7/74* (2006.01)
(52) U.S. Cl.
USPC ....................................................... 297/217.3
(58) Field of Classification Search
USPC ........................................................ 297/217.3
See application file for complete search history.

(56) References Cited

U.S. PATENT DOCUMENTS

| | | | |
|---|---|---|---|
| 5,975,568 A | 11/1999 | Speckhart et al. | |
| 6,045,155 A * | 4/2000 | Cech et al. | 280/735 X |
| 6,101,436 A * | 8/2000 | Fortune et al. | 280/735 |
| 6,246,936 B1 * | 6/2001 | Murphy et al. | 280/735 |
| 6,438,476 B1 * | 8/2002 | Gray et al. | 280/735 |
| 6,438,477 B1 * | 8/2002 | Patterson et al. | 280/735 |
| 6,479,766 B2 * | 11/2002 | Gray et al. | 280/735 X |
| 6,578,871 B2 * | 6/2003 | Gray et al. | 280/735 X |
| 6,674,024 B2 * | 1/2004 | Cech et al. | 280/735 |
| 7,000,948 B2 * | 2/2006 | Little et al. | 280/743.1 |

* cited by examiner

*Primary Examiner* — Anthony D Barfield
(74) *Attorney, Agent, or Firm* — Lawrence D. Hazelton

(57) ABSTRACT

A device configured to be installed in a vehicle seat for estimating an occupant weight. The device includes a bladder and a pressure sensor. The bladder is configured to define a cavity characterized as having a center of gravity. The bladder is effective to retain a fluid and pressurize the fluid in response to an occupant weight upon the bladder. The bladder is also configured to define an opening to the cavity. The pressure sensor is coupled directly to the opening in a manner effective to seal the opening and locate the pressure sensor proximate to the center of gravity. The pressure sensor provides a pressure signal indicative of the occupant weight.

14 Claims, 4 Drawing Sheets

US 8,641,142 B2

WEIGHT BASED VEHICLE SEAT OCCUPANT DETECTION DEVICE

TECHNICAL FIELD OF INVENTION

The invention generally relates to vehicle occupant detection systems, and more particularly relates to a device in a vehicle seat configured to estimate an occupant weight of an occupant residing on the vehicle seat.

BACKGROUND OF INVENTION

Many vehicles, in particular automobiles, are equipped with occupant detection devices so occupant protection devices such as airbags can be enabled or disabled based on who or what is occupying a seat in the vehicle. For example, if a seat is empty, or occupied by a small child, it may be desirable to reduce the deployment force or disable an airbag for that seat to prevent airbag deployment if the vehicle is involved in a collision. One way to estimate the size of a seat occupant is to equip the seat with a device that estimates occupant weight. One such device has a fluid filled bladder placed in the seat cushion, and a pressure sensor. The occupant weight is estimated by sensing a fluid pressure of the fluid in the bladder.

A typical configuration of such a weight sensing device is shown in FIG. 1. A bladder 10 is filled with a fluid and is positioned in a seat cushion 12. Fluid pressure in the bladder 10 is coupled to a remote pressure sensor 14 by a hose 16 that is also filled with the fluid. The remote pressure sensor 14 may be attached to the seat cushion 12, or attached to the vehicle. When a person sits on the seat cushion 12, a change in fluid pressure in the bladder 10 is sensed by the pressure sensor 14 because of the fluidic coupling through the hose 16. A pressure signal from the pressure sensor 14 is processed by other electronics typically co-located with the pressure sensor 14 to output a weight estimate or seat-occupied signal to the vehicle over a wire 18. This weight estimate or seat-occupied signal is used by other systems in the vehicle to enable or disable occupant protection devices of the vehicle. However, it has been discovered that the fluid pressure in the bladder may not be precisely the same as the fluid pressure sensed by the pressure sensor since other factors may influence the relationship between the weight of the occupant and the pressure sensor reading.

One discovery was that changes in seat orientation or inclination angle relative to the vehicle and/or the direction of gravity may change the effective vertical separation between a point comparable to the center of gravity of the bladder 10 and the pressure sensor 14. The vertical separation creates a pressure difference between fluid in the bladder 10 and fluid at the pressure sensor 14 commonly known as head pressure. If the vertical separation is constant, then the head pressure is generally constant and so the effects can be accounted for when estimating occupant weight. However if the vertical separation changes because, for example, the inclination angle of the seat is changed, then the head pressure will change and could effect the accuracy of the occupant weight estimate.

It was also discovered that vehicle dynamics such as longitudinal acceleration caused by braking or accelerating the vehicle, and lateral acceleration caused by the vehicle turning could dynamically change the fluid pressure in the hose routed to the pressure sensor. While not subscribing to any particular theory, the effect appears to be linked to an effective horizontal separation between a point corresponding to the center of gravity of the bladder 10 and the pressure sensor 14. It should be appreciate that the degree to which vehicle dynamics affect a pressure difference between the bladder center of gravity and the pressure sensor depends on the length and routing of the hose.

Another discovery was that the mechanical properties of the material used to form the bladder changed with temperature. At reduced temperatures the bladder materials became stiffer and less viscous thus becoming less responsive to the occupant weight being applied. According to one theory, the bladder material becomes stiffer at reduced temperatures and so a variable portion of the occupant weight is supported by the bladder structure itself, and so a portion of the occupant weight may not influence the fluid pressure. The prior art attempted to correct this problem by including a temperature sensor in the remote pressure sensor. However because some seats are equipped with heating elements for warming the occupant in cold weather, the temperature measured at the remote pressure sensor did not always correspond with the temperature of the bladder.

SUMMARY OF THE INVENTION

The invention described herein positions a pressure sensor in close proximity to a bladder and near a select position of the bladder so that a pressure signal from the pressure sensor is minimally influenced by changes in the orientation of a vehicle seat in which the bladder and pressure sensor are installed, and is minimally influenced by accelerations arising from vehicle motion.

In accordance with one embodiment of this invention, a device configured to be installed in a vehicle seat is provided. The device includes a bladder and a pressure sensor. The bladder is configured to define a cavity characterized as having a center of gravity. The bladder is effective to retain a fluid and pressurize the fluid in response to an occupant weight upon the bladder. The bladder is also configured to define an opening to the cavity. The pressure sensor is coupled directly to the opening in a manner effective to seal the opening and locate the pressure sensor proximate to the center of gravity. The pressure sensor is configured to provide a pressure signal indicative of the occupant weight.

In another embodiment of the present invention, a vehicle seat assembly is provided. The vehicle seat includes a seat cushion, a bladder, and a pressure sensor. The seat cushion defines a seating surface. The bladder is located proximate to the seating surface. The bladder is configured to define a cavity characterized as having a center of gravity. The bladder is effective to retain a fluid and pressurize the fluid in response to an occupant weight upon the bladder. The bladder is also configured to define an opening to the cavity. The pressure sensor is coupled directly to the opening in a manner effective to seal the opening and locate the pressure sensor proximate to the center of gravity. The pressure sensor is configured to provide a pressure signal indicative of the occupant weight.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 2:
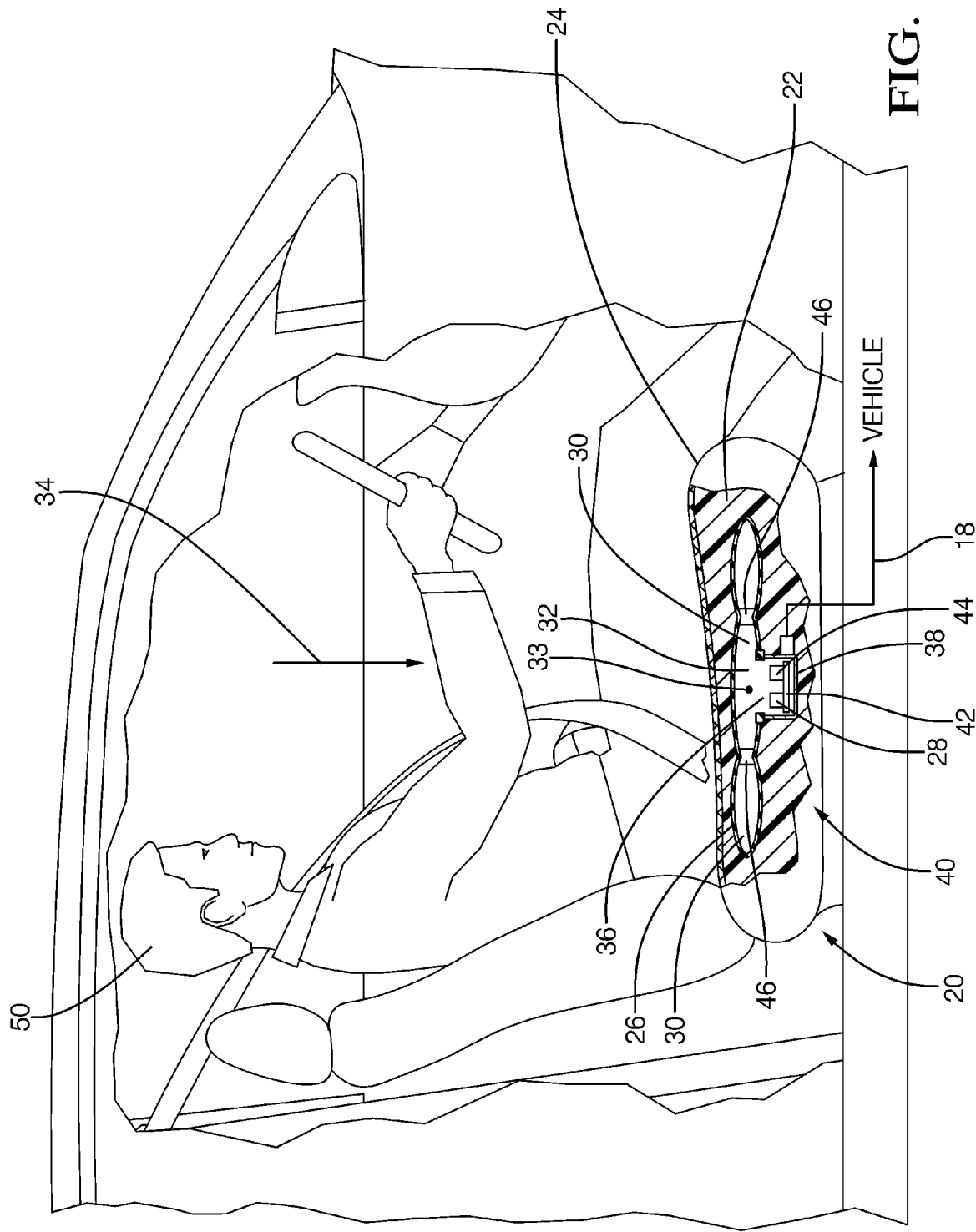
FIG. 2 is a cross sectional view of a vehicle seat equipped with an occupant detection device in accordance with one embodiment.

In accordance with an embodiment, FIG. 2 illustrates a vehicle seat assembly 20. The vehicle seat assembly 20 includes a seat cushion 22 defining a seating surface 24. The seat cushion 22 may be formed of a compressible foam or the like having mechanical properties suitable for sitting upon. The seating surface 24 may include a layer of cloth, leather, or other suitable material to make the seat assembly 20 appear attractive and protect the material forming the seat cushion 22 from damage.

The seat assembly 20 includes a bladder 26 and a pressure sensor 28, the combination of which may be referred to as an occupant detection device, hereafter the device 40. The bladder 26 is preferably located proximate to the seating surface so that as an occupant 50 sits on the seat assembly 20 the bladder 26 is subject to sufficient force to cause a change in the fluid pressure within the bladder 26. The bladder 26 is configured to define a cavity 30. The embodiment shown in FIG. 1 has multiple cavities 30, but it will be appreciated that other configurations of bladder 26 are possible, including a configuration having a single cavity. The cavity 30 may be characterized as having a center of gravity 33. As will be explained in more detail below, it is advantageous to position the pressure sensor 28 as close as possible to the center of gravity 33 so that the fluid pressure detected by the pressure sensor 28 is not substantially influenced by the orientation of the seat assembly 20 relative to the force of gravity, or by accelerations caused by vehicle motion such as braking or cornering.

Material selected to form the bladder 26 needs to retain a fluid 32 and pressurize the fluid in response to an occupant weight upon the bladder 26. The direction of force applied to the bladder 26 by the occupant weight is indicated by arrow 34, hereafter weight 34. A non-limiting example of a material suitable to form the bladder 26 is thermoplastic polyurethane such as Pellethane that is sold by the Lubrizol Corporation. A material such as Estane 58212, also sold by the Lubrizol Corporation, could be used to make the pressure sensor enclosure. This material can be thermally bonded to the polyurethane in a manufacturing production setting to seal the sensor electronics enclosure to the bladder. A non-limiting example of a material suitable for use as the fluid 32 is polydimethylsiloxane fluid sold by Dow Corning Corporation. It will be appreciated that polydimethylsiloxane fluid is preferable for some configurations of device 40 as electronic devices such as the pressure sensor 28 and other electronics described below can be directly exposed to polydimethylsiloxane fluid without damaging the electronics. The direct contact of the polydimethylsiloxane fluid is also advantageous in that it acts as a heat sink for the electronics. The bladder 26 may also be configured to define an opening 36 to the cavity 30. The opening 36 is generally configured to be suitable for attaching the pressure sensor 28, or a module 38 that provides an enclosure for the pressure sensor 28, to the bladder 26. The pressure sensor 28, or module 38, is preferably coupled directly to the opening 36 in a manner effective to seal the opening 36 and locate the pressure sensor 28 proximate to the center of gravity 33. The pressure sensor is generally configured to provide a pressure signal indicative of the occupant weight.

Figure 1:
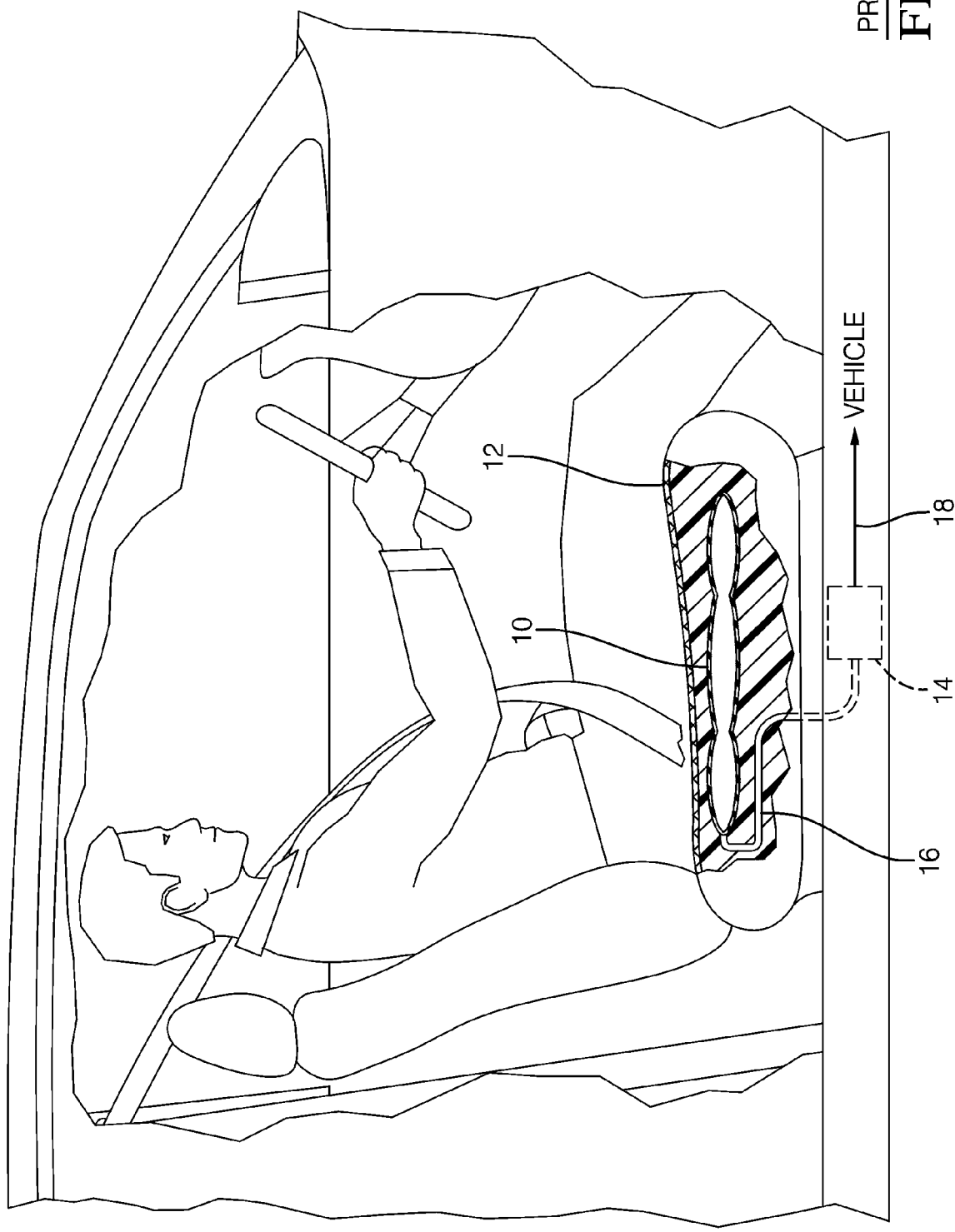
FIG. 1 is a cross sectional view of a vehicle seat equipped with an occupant detection device in accordance with one embodiment.

It has been observed during testing of seat assemblies having an arrangement of bladder 10 and pressure sensor 14 similar to that shown in FIG. 1, that the fluid pressure indicated by the pressure sensor 14 changes when the orientation of the seat assembly relative to the vehicle or direction of gravity is changed. The orientation can be changed by an occupant 50 adjusting the seat orientation relative to the vehicle to be comfortable, or can be changed by the vehicle traveling uphill or downhill. The test data indicates that a pressure signal from the pressure sensor 14 may vary by 10% of full scale reading in response to a change in seat inclination angle of +/−15 degrees. Such a change may reduce the accuracy of classifying the size of a seat occupant 50. For example, a small adult residing on the seat may be classified as a child, and so the occupant protection device activation may be unnecessarily deactivated. The embodiment illustrated in FIG. 2 positions the opening 36 and the pressure sensor 28 so that changes in pressure signal due to changes in an inclination angle of the vehicle seat are minimized. While not subscribing to any particularly theory, it has been observed that if the pressure sensor 28 is located proximate to the center of gravity 33, that is as close as possible given any packaging constraints imposed by other features present in the seat assembly 20, the change in pressure signal due to changes in inclination angle of the seat assembly are reduced. An embodiment similar to that shown in FIG. 2 was analyzed, and the effect of a +/−15 degree change in inclination angle registered a change in the pressure signal of about 6% of full scale.

It has been suggested that seat assemblies having an arrangement of bladder 10 and pressure sensor 14 similar to that shown in FIG. 1 may influence the fluid pressure indicated by the pressure sensor 14 changes when the vehicle experiences various dynamic accelerations such as longitudinal acceleration caused by the vehicle accelerating from a stop to some speed or braking from some speed to a stop. Dynamic acceleration may also include lateral acceleration caused by the vehicle executing a turn while traveling at some speed. An analysis indicates that the arrangement shown in FIG. 1 may exhibit a 20% variation of the full scale pressure signal during accelerations at the limits of typical vehicle capability, and that the arrangement shown in FIG. 2 exhibits less than an 11% variation of the full scale pressure signal during the same accelerations. As such, it is advantageous for the opening to be located on the bladder 26 such that changes in pressure signal due to vehicle acceleration are minimized.

An embodiment of the device 40 may include a temperature sensor 44 in direct contact with the fluid 32 in the cavity 30 via fluid 32 in the opening 36. As such, the temperature sensor 44 is configured to provide a temperature signal indicative of a bladder temperature. It has been observed during testing of seat assemblies having an arrangement of bladder 10 and pressure sensor 14 similar to that shown in FIG. 1, that a change in temperature of 40 degrees Celsius may induce a change in the pressure signal of 5% of full scale. As illustrated in FIG. 2, the temperature sensor 44 is located so that it thermally coupled to the fluid 32 in the cavity 30. While not subscribing to any particular theory, the change in pressure signal may be attributed to changes in the mechanical properties of materials used to make the cushion 22, cover the seating surface 24, and form the bladder 26. By thermally close coupling the temperature sensor 44 to the bladder 26, the effects of temperature on the pressure signal are readily determined by empirical testing, and so a compensation table or equation can be readily developed. The compensation table or equation is simplified because it does not need to account for a temperature difference between the bladder 10 and the pressure sensor 14 illustrated in FIG. 1. Furthermore, a time lag between a transient temperature change of the bladder 10 and the temperature at the pressure sensor 14 is minimized. For example, if a seat heating element is generating heat, the temperature of the bladder 10 will increase faster than the temperature of fluid at the pressure sensor 14. This time lag is typically difficult to characterize and compensate. The aggregate of the various conditions described above yields a total possible of 35% of full scale for the parameters of tilt 10%, vehicle dynamics 20%, and temperature 5%. This can be improved as described in this invention to 18% of full scale with the above parameters reduced to: tilt 6%, vehicle dynamics 11% and temperature 1%.

Figure 3:
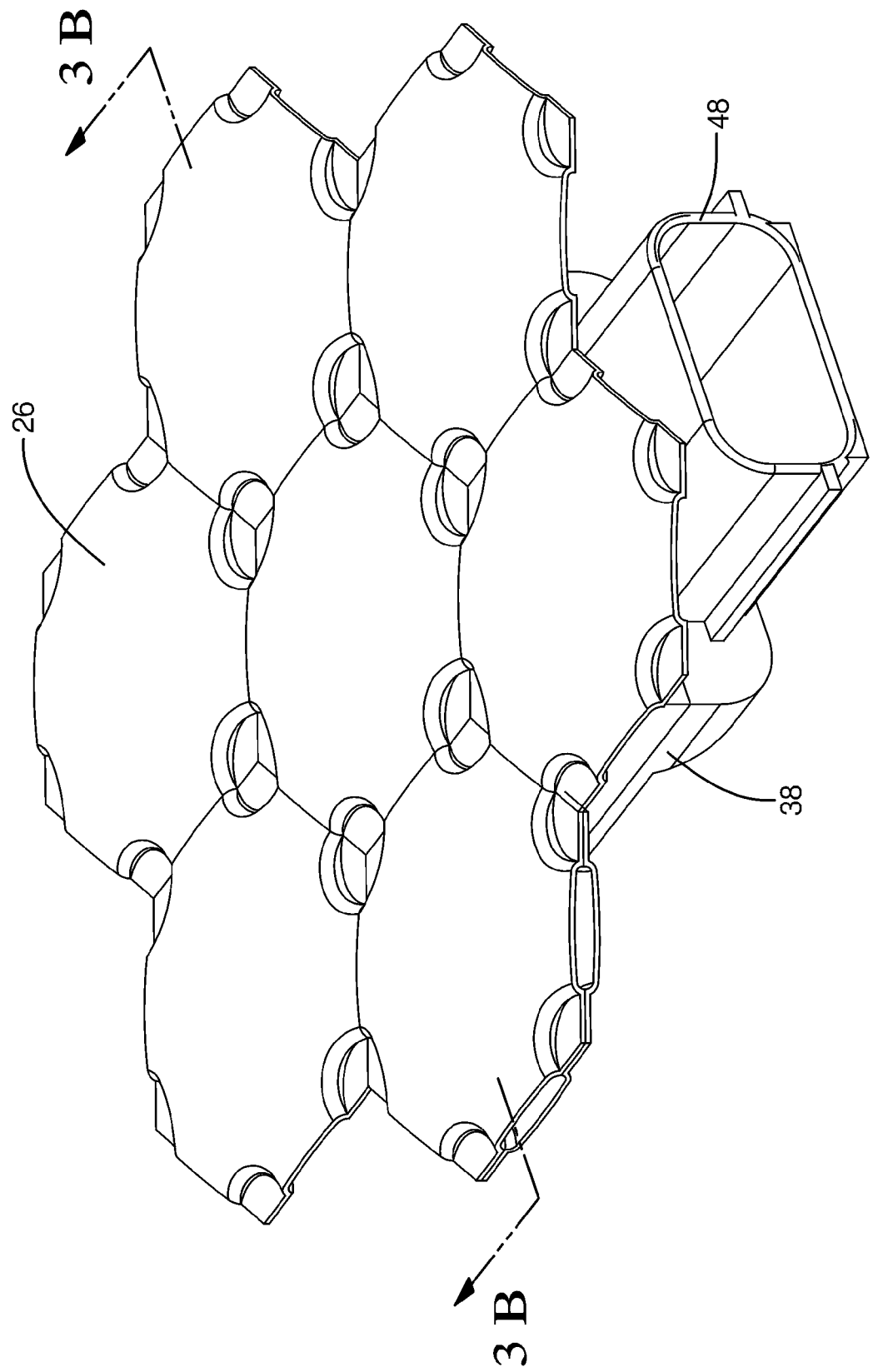
FIG. 3 is a perspective view of an occupant detection device in accordance with one embodiment.
Figure 3:
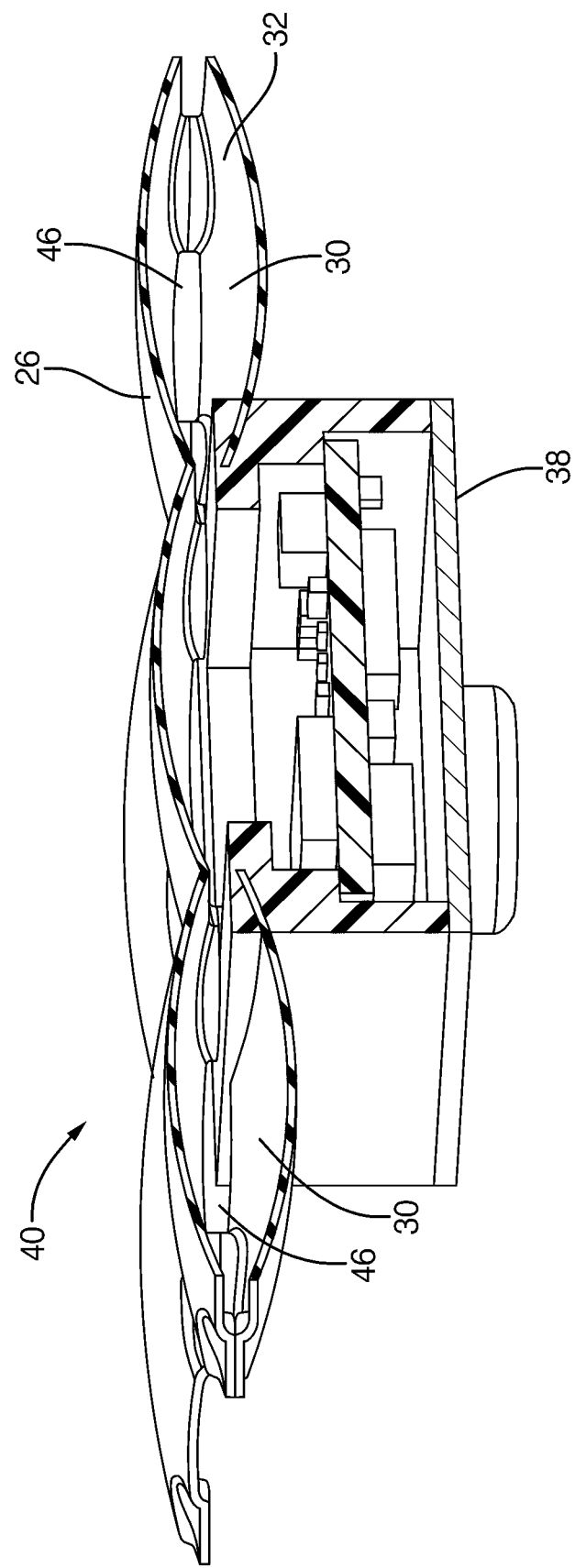

An embodiment of the device 40 may include a controller 42 configured to estimate an occupant weight based on the pressure signal. The controller 42 may include a processor such as a microprocessor or other control circuitry as should be evident to those in the art. The controller 42 may include memory, including non-volatile memory, such as electrically erasable programmable read-only memory (EEPROM) for storing one or more routines, thresholds and captured data. The one or more routines may be executed by the processor to perform steps for determining if signals received by the controller 42 for estimating an occupant weight as described herein. The pressure sensor 28 may be integrated into the controller 42, or may be a separate device interconnected to the controller by, for example, wires. If the device 40 includes a temperature sensor 44, then the controller may configured to estimate an occupant weight based on the temperature signal and the pressure signal. It will be appreciated that that the bladder does not dissipate any power and only acts as a passive thermal mass, while the electronics may dissipate power. If the electronics are remote from the bladder, their temperatures will never be the same as long as there isn't any thermal conduction path linking the two together, and some compensation and prediction of the temperature difference would be needed FIG. 3 illustrates an alternate embodiment of the device 40 where the bladder 26 is configured to define a plurality of cavities 30, wherein the fluid 32 in the cavities 30 are interconnected by one or more fluid passageways 46. The hexagon pattern illustrated has been demonstrated in testing to provide a device 40 having reduced sensitivity to effects of varied seating position of an occupant 50 on the ability of device 40 to estimate an occupant weight. The module 38 may include a connector 48 so that the device 40 can be readily electrically connected to the vehicle by a wire harness (not shown) similar to wire 18 shown in FIGS. 1 and 2.

Accordingly, a device 40 and a seat assembly 20 are provided for determining an estimate of an occupant weight. By providing a bladder 26 that has a degree of symmetry about both the longitudinal and lateral axis of the vehicle, a pressure sensor located proximate to the center of the bladder 26 and thereby located proximate to the center of gravity 33 of the bladder 26, is less influenced by changes in the angle or orientation of the bladder 26, and is less influenced by changes in accelerations experienced by the bladder 26. According to one theory, this is because the fluid pressure at the center of gravity is generally not influenced by changes in orientation or acceleration, or at least the changes are at a minimum when compared to pressure changes at other locations in the bladder, or at the end of a hose connected to and spaced apart from the bladder.

While this invention has been described in terms of the preferred embodiments thereof, it is not intended to be so limited, but rather only to the extent set forth in the claims that follow.

We claim:

1. A device configured to be installed in a vehicle seat, said device comprising:
   a bladder configured to define a cavity characterized as having a center of gravity, said bladder effective to retain a fluid and pressurize the fluid in response to an occupant weight upon the bladder, said bladder also configured to define an opening to the cavity centered in line with the center of gravity relative to the force of gravity when the bladder is installed in the vehicle seat; and
   a module that includes a pressure sensor and a temperature sensor, said module coupled directly to the opening without an intervening hose between the bladder and the module such that the pressure sensor and the temperature sensor are submerged and overlaid by the fluid, and coupled in a manner effective to seal the opening and locate the pressure sensor proximate to the center of gravity and centered in the opening such that changes in bladder orientation and vehicle accelerations do not influenced pressure readings by the pressure sensor, said module configured to provide a pressure signal indicative of the occupant weight.

2. The device in accordance with claim 1, wherein said opening is located on the bladder such that changes in pressure signal due to changes in an inclination angle of the vehicle seat are minimized.

3. The device in accordance with claim 1, wherein said opening is located on the bladder such that changes in pressure signal due to vehicle acceleration are minimized.

4. The device in accordance with claim 1, wherein said device further comprises a controller configured to estimate an occupant weight based on the pressure signal.

5. The device in accordance with claim 1, wherein said temperature sensor is configured to provide a temperature signal indicative of a bladder temperature.

6. The device in accordance with claim 5, wherein said device further comprises a controller configured to estimate an occupant weight based on the temperature signal and the pressure signal.

7. The device in accordance with claim 1, wherein said bladder is configured to define a plurality of cavities, wherein the fluid in the cavities are interconnected by one or more fluid passageways.

8. A vehicle seat assembly comprising:
   a seat cushion configured to define a seating surface;
   a bladder located proximate to the seating surface, said bladder configured to define a cavity characterized as having a center of gravity, said bladder effective to retain a fluid and pressurize the fluid in response to an occupant weight upon the bladder, said bladder also configured to define an opening to the cavity centered in line with the center of gravity relative to the force of gravity when the bladder is installed in the vehicle seat; and
   a module that includes a pressure sensor and a temperature sensor, said module coupled directly to the opening without an intervening hose between the bladder and the module such that the pressure sensor and the temperature sensor are submerged and overlaid by the fluid, and coupled in a manner effective to seal the opening and locate the pressure sensor proximate to the center of gravity and centered in the opening such that changes in bladder orientation and vehicle accelerations do not influenced pressure readings by the pressure sensor, said module configured to provide a pressure signal indicative of the occupant weight.

9. The device in accordance with claim 8, wherein said opening is located on the bladder such that changes in pressure signal due to changes in an inclination angle of the vehicle seat are minimized.

10. The device in accordance with claim 8, wherein said opening is located on the bladder such that changes in pressure signal due to vehicle acceleration are minimized.

11. The device in accordance with claim 8, wherein said device further comprises a controller configured to estimate an occupant weight based on the pressure signal.

12. The device in accordance with claim 8, wherein said temperature sensor is configured to provide a temperature signal indicative of a bladder temperature.

13. The device in accordance with claim 12, wherein said device further comprises a controller configured to estimate an occupant weight based on the temperature signal and the pressure signal.

14. The device in accordance with claim 8, wherein said bladder is configured to define a plurality of cavities, wherein the fluid in the cavities are interconnected by one or more fluid passageways.

\* \* \* \* \*